(No Model.)
R. W. DUGAN.
CONDENSER FOR EXHAUST STEAM.
No. 467,715. Patented Jan. 26, 1892.
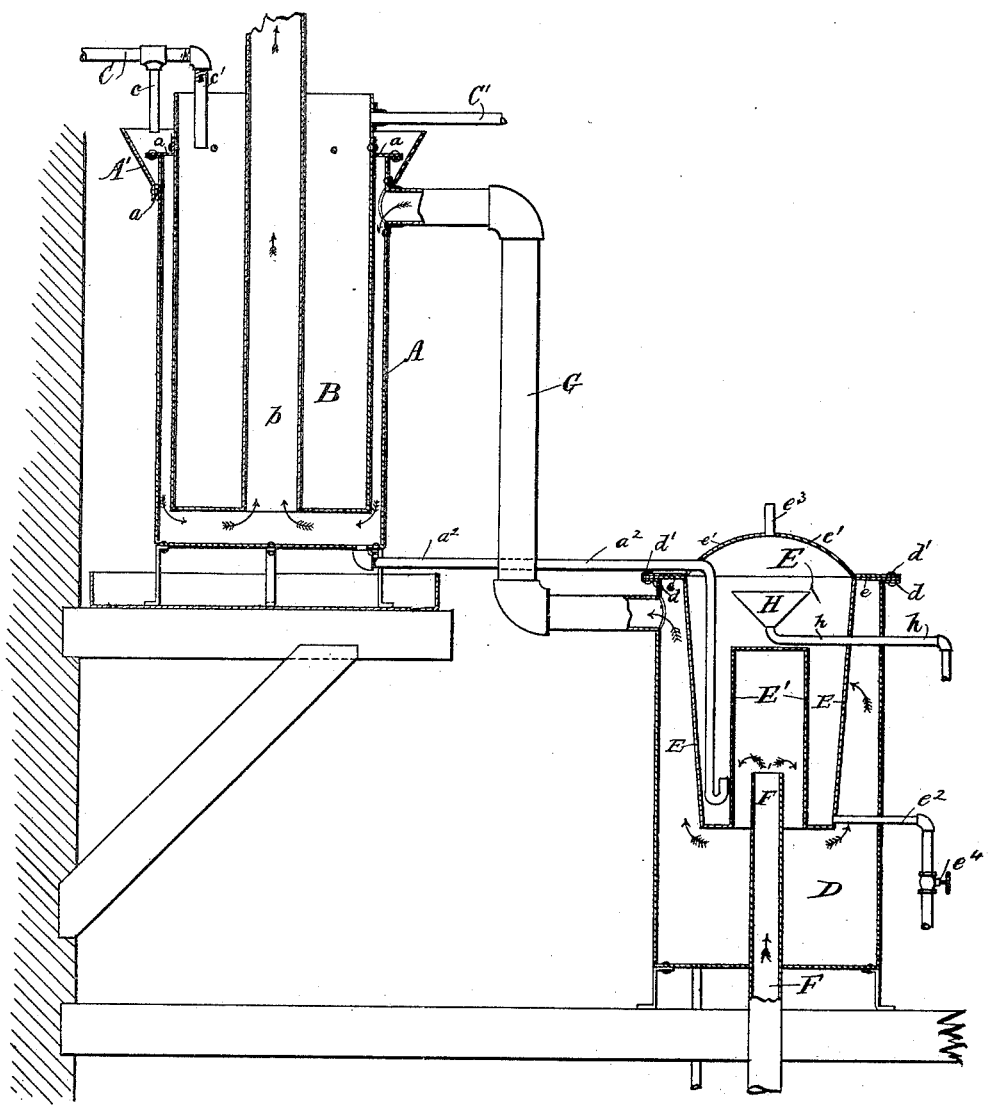

UNITED STATES PATENT OFFICE.

REES W. DUGAN, OF COVINGTON, KENTUCKY.

CONDENSER FOR EXHAUST-STEAM.

SPECIFICATION forming part of Letters Patent No. 467,715, dated January 26, 1892.

Application filed October 26, 1891. Serial No. 409,828. (No model.)

*To all whom it may concern:*

Be it known that I, REES W. DUGAN, a citizen of the United States, and a resident of Covington, in the county of Kenton and State of Kentucky, have invented certain new and useful Improvements in Condensers for Exhaust-Steam, of which the following is a specification.

The object of my invention is to provide an improved means for condensing exhaust-steam and freeing the condensed water from the lubricant which is carried by the steam from the cylinder and piston of the engine, and also to expel air and noxious gases from the water.

My invention is particularly adapted to furnish pure water to be used in making ice, but is of course applicable to other purposes for which pure water is required.

I attain these objects by the means illustrated in the accompanying drawing, which is a central vertical sectional view of an apparatus embodying my invention.

In carrying out my invention I employ a condenser of any improved form and connect with it between the said condenser and the exhaust from the cylinder of the engine what I term a "reboiler," in which the condensed water is received, reboiled, and freed from impurities.

Referring to the drawing, like parts are indicated by similar reference-letters wherever they occur throughout the various views.

The condenser consists of an outer cylindrical vessel A and an inner vessel B, suspended within it by means of a flange $a$, which is secured to the top of the vessel A and to the shell of the vessel B near its top, thus forming a steam-space between the outer and inner vessel. The inner vessel has a central pipe $b$ passing up through it to carry off any of the waste steam that may not be condensed.

A′ is a funnel secured around the upper end of the vessel A by stay-bolts, which leaves a space between its lower end and the shell of the vessel.

C is a cold-water pipe having two branches $c\ c'$, one of which discharges into the vessel B and the other into the funnel A′.

C′ is an overflow or waste pipe from the water-vessel B.

The reboiler consists of a cylindrical vessel D and an inner vessel E. The vessel D has an outwardly-turned flange $d$, upon which the outwardly-turned flange $e$ of the inner vessel rests. $e'$ is a cap which has also an outwardly-turned flange, which rests upon the flange of the inner vessel, the three parts being secured together by rivets $d'$, passing through the flanges. The vessel E has an upwardly-extending tubular chamber E′ centrally within it, into which the exhaust-steam pipe F extends. This pipe leads from the cylinder of the engine through the bottom of the vessel D and preferably about one-fourth of the distance up into the chamber E′. The outer vessel A is connected to the vessel D by a pipe G, which is, in fact, an extension of the exhaust-steam pipe. From the bottom of the vessel A a pipe $a^2$ passes through the cap $e'$ of the reboiler and down to near the bottom of the vessel E, its lower end being upturned.

$e^2$ is a pipe leading from the bottom of the vessel E for the purpose of carrying off the purified water from the reboiler.

The skimmer for carrying off the impurities from the reboiler consists of the funnel-shaped vessel H, which is mounted upon the upturned end of a pipe $h$, which extends through the sides of the vessels D E.

$e^3$ is an open pipe leading from the center of the cap $e'$.

The operation of the device is as follows: Assuming that the vessel E is partially filled with water, the waste steam passing through the pipe F into the chamber E′, thence around the vessel E and out through the pipe G to the vessel A, as indicated by arrows, the waste steam will boil the water within the vessel E. The air and atmospheric gases are driven off through the pipe $e^3$. The steam is condensed in the vessel A and pipe $b$ by the cold water passing into the vessel B and trickling down the outside of the vessel A, and the condensed water is carried through the pipe $a^2$ into the vessel E. By means of the valve $e^4$ the discharge of the purified water from the vessel E is so regulated that the water-line is kept about level or a little above the top of the funnel H. Such portions of the lubricant as are carried off with the waste steam from the cylinder will rise to the top of the water in vessel E and be carried off through pipe $h$. When the device is once started, the operation is continuous, and the operator can readily tell by the discharge from the pipe $h$ whether the water in the vessel E is at the proper level or not. If the discharge is stopped, it is only necessary to close or partially close the valve $e^4$ until the dripping from the pipe $h$ indicates that the water is above the level of the top of the funnel H.

I do not desire to limit myself to the particular form of condenser shown, nor to the particular details of construction, as this may be varied in mechanical details without departing from the spirit or scope of my invention.

What I claim is—

1. In a condenser for waste steam, the combination, substantially as hereinbefore set forth, of the condenser, the reboiler consisting of an outer and inner vessel, the exhaust-pipe passing into the said outer vessel, the pipe G, connecting said outer vessel of the reboiler with the condenser, the pipe $a^2$, leading from the condenser into the inner vessel of the reboiler, and the discharge-pipe leading from the bottom of said inner vessel, for the purpose set forth.

2. The combination, substantially as specified, of the vessel D, the vessel E, suspended within it and having a chambered bottom E', the cap $e'$, covering said inner vessel and having a vent-pipe $e^3$, the exhaust-steam pipe F, passing through the bottom of the vessel D and discharged into the chamber E', the condenser consisting of the outer vessel A, inner vessel B, having central tube $b$, a funnel surrounding said outer vessel, the pipe G, connecting the vessels D and A, the pipe $a^2$, leading from the bottom of vessel A to near bottom of vessel E, the skimmer H within the vessel E and having a pipe $h$ leading to the outside of the vessel D, and the discharge-pipe $e^2$.

REES W. DUGAN.

Witnesses:
GEO. J. MURRAY,
FRANK S. DAVIS.